Figure 1:
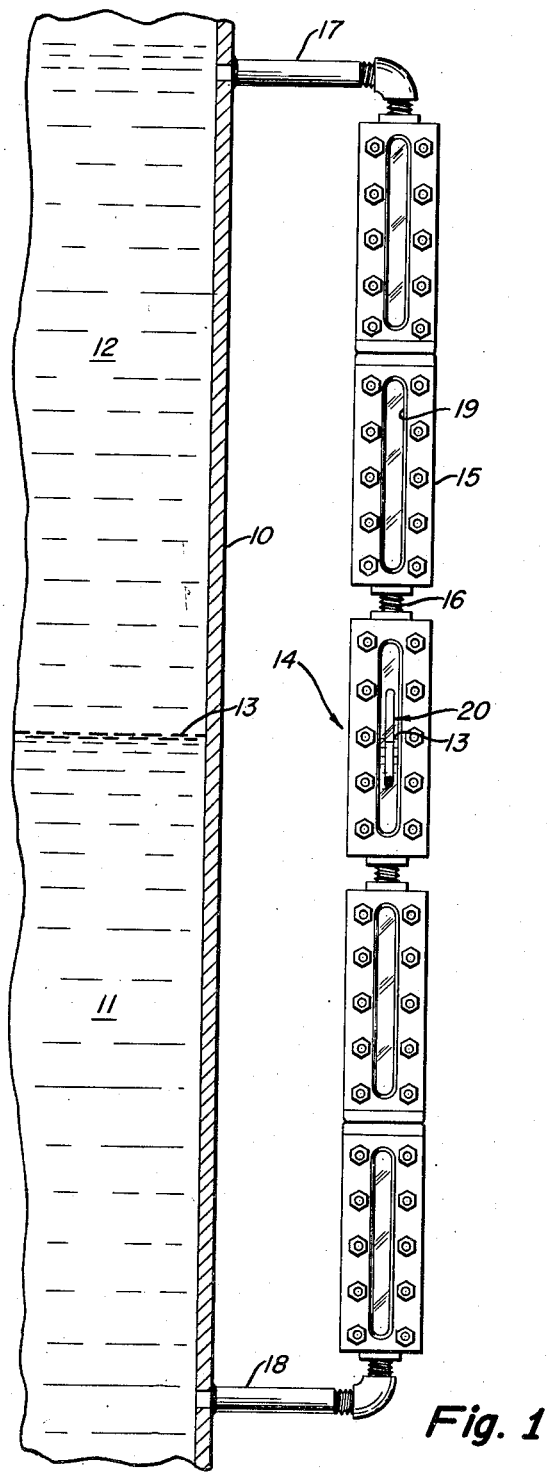

Oct. 23, 1956  A. T. JANCOSEK ET AL  2,767,586
INTERFACE LEVEL INDICATOR
Filed Aug. 31, 1954

INVENTORS:
Andrew T. Jancosek
BY  Andrew Jancosek, Jr.

Everett A. Johnson
ATTORNEY

United States Patent Office 2,767,586
Patented Oct. 23, 1956

2,767,586

INTERFACE LEVEL INDICATOR

Andrew T. Jancosek, Hammond, and Andrew Jancosek, Jr., Whiting, Ind., assignors to Standard Oil Company, Chicago, Ill., a corporation of Indiana Application August 31, 1954, Serial No. 453,340

4 Claims. (Cl. 73—329)

This invention relates to an improved liquid level indicating device and, in particular, to a type of apparatus which is adapted for indicating the interface level between two immiscible liquids of different specific gravity, but being either of substantially the same color or being nearly colorless.

In many instances it is necessary to determine the location of an interface between two adjacent bodies of fluids. For example, many settling systems have been employed to separate a mixture of two immiscible liquids into its components. In operating such a settling system, the two liquids usually separate into two bodies of liquids, one superposed upon the other with a so-called "interface" defining the boundary line between the two liquids. Generally, it is desired to locate such interface in order to control the depth of the lower body of liquid.

Although heretofore the location of such interface has been determined by visual inspection through a sight glass, the determination of the exact position of the interface is subject to inaccuracies and inconsistencies.

A particular problem arises when it is desired to locate the interface in one of several sight gauges connected vertically in series. The problem is acute when dealing with hydrocarbons and aqueous solutions which are of substantially the same color or colorless as is the case in some hydrocarbon-water systems. In pressure systems thick glass plates are used in the sight gauges and this contributes further to the difficulty of locating the interface.

It is, therefore, an object of this invention to provide an apparatus for permitting the accurate visual determination of the location of an interface between two bodies of fluids. A further object of this invention is to provide a simple apparatus for accurately and visually indicating the location of an interface between two bodies of liquids within a sight gauge. A further object is to provide an interface indicator which is simple in construction and economical to manufacture and maintain. Likewise, it is an object of the invention to provide a visual interface indicator which can be readily adapted for use on existing and widely used sight gauge equipment. These and other objects of our invention will become apparent to one skilled in the art as our description proceeds.

Briefly, we attain the objects of our invention by providing a transparent body with a colored interior and suitably weighted to float at the interface. Such construction enables an operator to accurately locate liquid levels.

We have found that an interface between two liquids which are of the same color or substantially colorless can be readily located by employing a float adapted to float at the interface between the fluids and providing said float with an easily identifiable color. If desired, such color may be luminescent and/or fluorescent. Therefore, by providing a float adapted to seek the interface between two fluids, the precise location of the interface can readily be determined.

Figure 2:
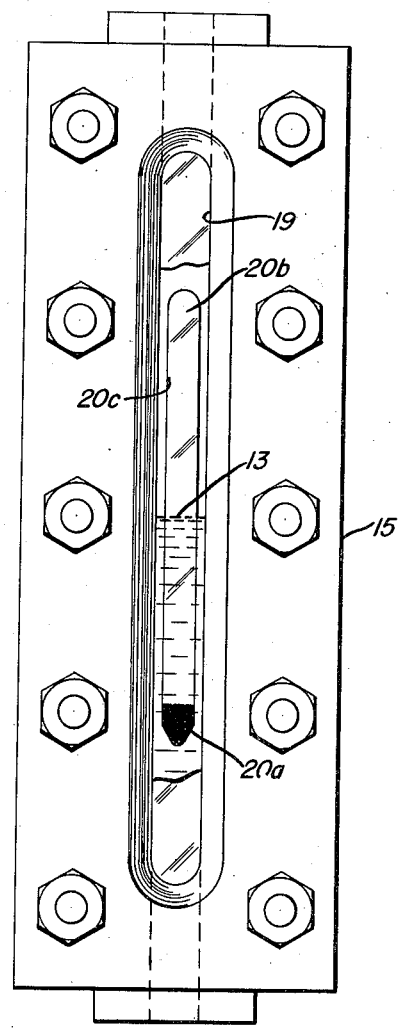

The features and advantages of the apparatus will be described with reference to the accompanying drawing which illustrates one specific form of the apparatus and wherein:

Figure 1 illustrates the invention as employed to determine an interface contained in a vessel having opaque walls; and Figure 2 is an enlarged view of a portion of the sight gauge and interface indicator shown in Figure 1.

In Figure 1, the vessel 10 contains a lower body of fluid 11 and an upper body of fluid 12 between which an interface 13 forms and which it is desired to locate. Attached to the vessel 10 is a vertical conduit 14 comprising a plurality of individual sight gauges 15 connected in series by nipples 16. The vertical conduit 14 is connected at its ends to vessel 10 by means of conduits 17 and 18 which are connected to the vessel 10 above and below the normal range of the interface 13. The level shown at 13 may be the interface between a liquid and a vapor or gas, or it may be the interface between two immiscible liquids of different specific gravities. This same interface or level 13 appears in the sight gauges 15.

An indicator 20, designed to float at the level indicated by dotted line 19 and of such size as to pass freely through the nipples 16, is free to move in the vertical conduit 14 with changes of the interface level in vessel 10. This indicator 20 may be made of glass, plastic, or other suitable corrosion-resistant and translucent or transparent material. A sufficient weighting material, such as metal shot, or a heavy liquid, such as mercury, is disposed in the lower portion 20a of the indicator 20. The upper float portion 20b of the indicator 20 can be a hollow tube of such volume that its displacement, taken with the weight of 20a, will permit it to sink in upper fluid 12 and yet float on the surface of liquid 11 in such a manner that it will come to rest at the interface 13 between the two bodies within the vertical conduit 14 which interface corresponds to the level in the vessel 10.

Adjustment of the exterior diameter of the indicator 20 can readily be accomplished so that it will be free to travel vertically within the conduit 14. However, the interior diameter of the vertical conduit 14 and the exterior diameter of the indicator float 20 should be adjusted so that it will have a minimum of lateral movement within the individual sight gauges 15 but will freely pass through the connecting nipples 16.

For example, a float about six inches long and about one-half inch in diameter made of blue glass and weighted with lead shot was found to follow the interface between a hydrocarbon liquid and an aqueous liquid in a plant operation.

In this installation, the vertical conduit 14 comprised series connected sight gauges 15 having sight openings 19 covered by heavy glass windows. Whereas the interface was followed with great difficulty prior to the installation of the float according to our invention, it can now be readily determined with extreme accuracy.

The brilliant color can be imparted to the float 20b by coloring the material from which it is made or by applying a colored coating 20c to the interior of the hollow float 20b. Such interior coloring may be applied by introducing a small amount of silver or aluminum powder into the float which is then sealed off at the top. Upon only slight shaking the powder distributes itself satisfactorily to coat the inside of the bubble or float. It is also contemplated that a fluorescent powder or a fluorescent paint may be applied to the interior of the float to provide the brilliant color. Alternatively, the weighting and coloring may be effected by a single substance such as by using a heavy pigment for the weight 20a and distributing a portion of the pigment within the chamber 20b to provide the coating 20c.

Although the invention has been described by reference to a preferred embodiment thereof, it is to be understood that this description is by way of illustration only and that it is not intended to limit the invention thereto since alternative embodiments and constructions of the invention will become apparent to those skilled in the art in view of our description of the invention.

What we claim is:

1. An apparatus for determining the location of an interface between two bodies of fluids within an opaque vessel comprising in combination a vertical conduit having its lower end connected with the lower one of said bodies of fluid and its upper end connected with the upper one of said bodies of fluid so that an interface between such fluids will be formed in said conduit, a hollow cylindrical float situated in said conduit, said float being formed of a translucent material and weighted in such a fashion that its displacement will cause it to float at the said interface, and a plurality of sight ports in said conduit whereby the position of said float within said conduit can be visually determined.

2. An apparatus for determining the location of an interface between two bodies of immiscible liquids comprising in combination a conduit having its ends connected with said bodies of liquids so that an interface is formed in said conduit, a visually distinguishable float situated in said conduit and formed so that its displacement will cause it to float at the said interface, said float comprising a hollow translucent colored body and a weighting means within a lower portion of said body whereby said float is maintained in an upright position within said conduit, the external diameter of said float and the internal diameter of said conduit being such that the float displaces a major portion of the fluid immediately adjacent said float within said conduit, thereby reducing to a minimum the envelope of liquid through which the float is viewed.

3. The apparatus of claim 2 which includes at least one sight port in said conduit within the range of said interface.

4. An apparatus for determining the location of an interface between two immiscible liquids the interface between which is not readily discernible comprising in combination a conduit having its ends in communication with said bodies of liquids so that an interface is formed within said conduit, at least one sight port in said conduit in the range of said interface, a visually distinguishable float situated in said conduit and adapted to pass freely within said sight port, said float comprising a translucent body having a displacement and cross-sectional area such that the float displaces a major portion of the fluids immediately adjacent said float within said sight port thereby reducing to a minimum the envelope of immiscible liquids through which the float is viewed, and a weighting means within a lower portion of said body whereby the displacement of the float will bring it to rest at the said interface in an upright position within said sight port.

References Cited in the file of this patent

UNITED STATES PATENTS

| | | |
|---|---|---|
| 37,709 | Smedley | Feb. 17, 1863 |
| 1,150,122 | Jeavons | Aug. 17, 1915 |
| 1,181,139 | Huntress | May 2, 1916 |
| 1,249,565 | Wagner | Dec. 11, 1917 |
| 1,363,139 | Mason | Dec. 21, 1920 |
| 2,631,183 | Babis | Mar. 10, 1953 |